United States Patent [19]
DeFrance

[11] Patent Number: 6,076,236
[45] Date of Patent: Jun. 20, 2000

[54] TOP OPENING CABLE CONNECTOR

[75] Inventor: Robert V. DeFrance, Poughkeepsie, N.Y.

[73] Assignee: MacLean-Fogg Company, Mundelein, Ill.

[21] Appl. No.: 09/286,639

[22] Filed: Apr. 2, 1999

[51] Int. Cl.[7] .................................................. F16G 11/00
[52] U.S. Cl. .................................. 24/136 R; 24/132 WL; 294/102.1; 403/374.2
[58] Field of Search ..................... 294/102.1; 403/374.1, 403/374.2, 275; 16/205; 24/136 R, 115 M, 132 R, 132 WL; 174/65 SS

[56] References Cited

U.S. PATENT DOCUMENTS

| | | | |
|---|---|---|---|
| 482,975 | 9/1892 | Cope | 24/136 R |
| 922,814 | 5/1909 | Reece | 294/102.1 X |
| 1,509,565 | 9/1924 | Oswald | 294/102.1 X |
| 3,758,922 | 9/1973 | Field . | |
| 3,912,406 | 10/1975 | McGrath | 403/374.2 X |
| 4,407,471 | 10/1983 | Wilmsmann et al. . | |
| 4,872,626 | 10/1989 | Lienart . | |
| 5,015,023 | 5/1991 | Hall . | |
| 5,539,961 | 7/1996 | DeFrance . | |

FOREIGN PATENT DOCUMENTS

| | | | |
|---|---|---|---|
| 2393654 | 2/1979 | France | 294/102.1 |
| 593110 | 5/1959 | Italy | 294/102.1 |

*Primary Examiner*—James R. Brittain
*Assistant Examiner*—Robert J. Sandy
*Attorney, Agent, or Firm*—Mason, Kolehmainen, Rathburn & Wyss

[57] ABSTRACT

A cable connector for securing the end of a cable includes a body supporting opposed jaws for sliding motion for gripping a cable with a wedge action. A slot in the top wall of the body permits the cable to be loaded from the top of the body. T-shaped guide structures capture the jaws for controlled sliding movement. Separate springs directly and independently bias the jaws toward a closed position. A sturdy latch plate synchronizes the jaw motion and retains the jaws in a cocked, open position ready to receive a cable. The springs are enclosed at the sides of the jaws, and are of substantial length.

18 Claims, 3 Drawing Sheets

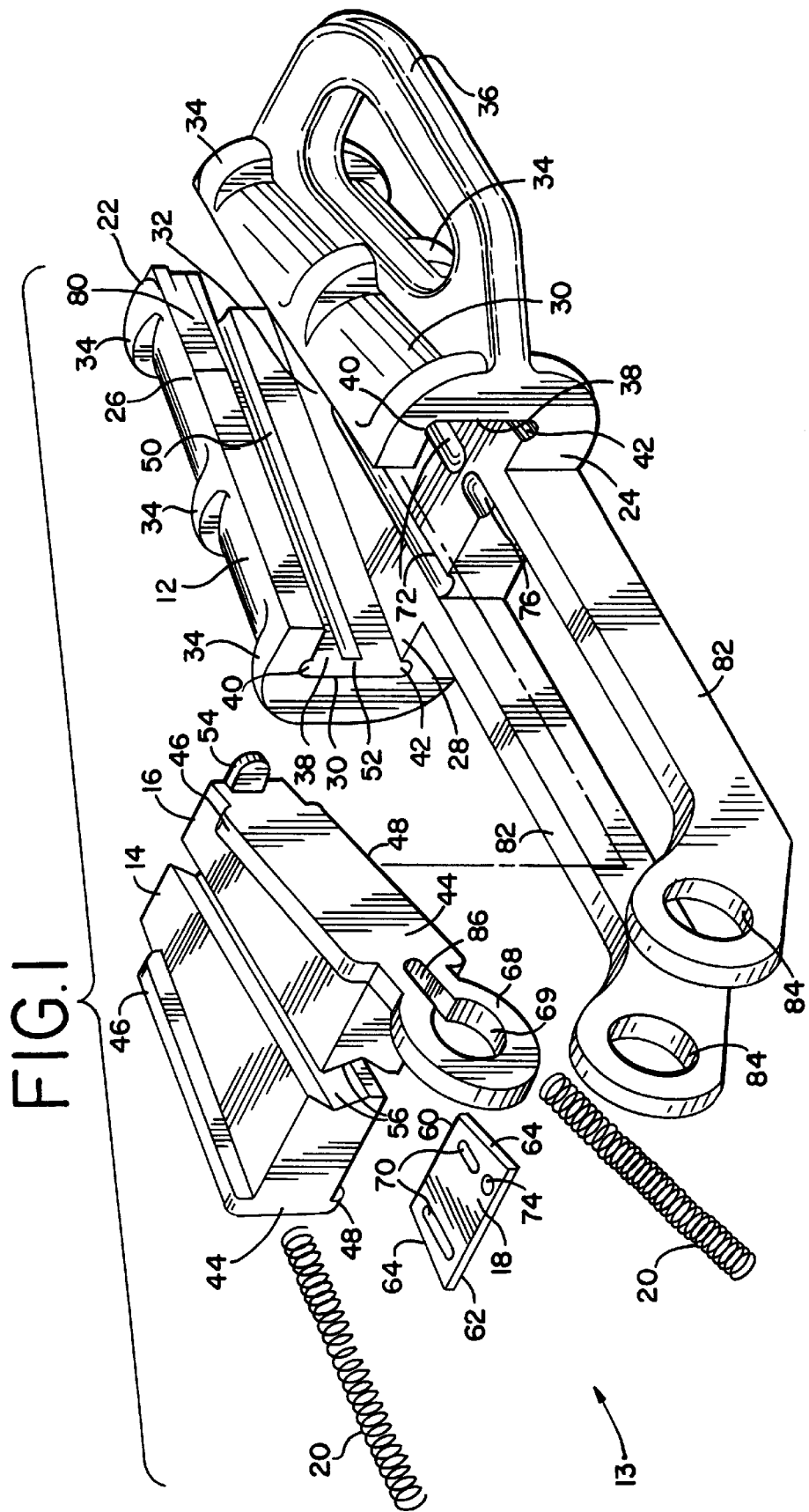

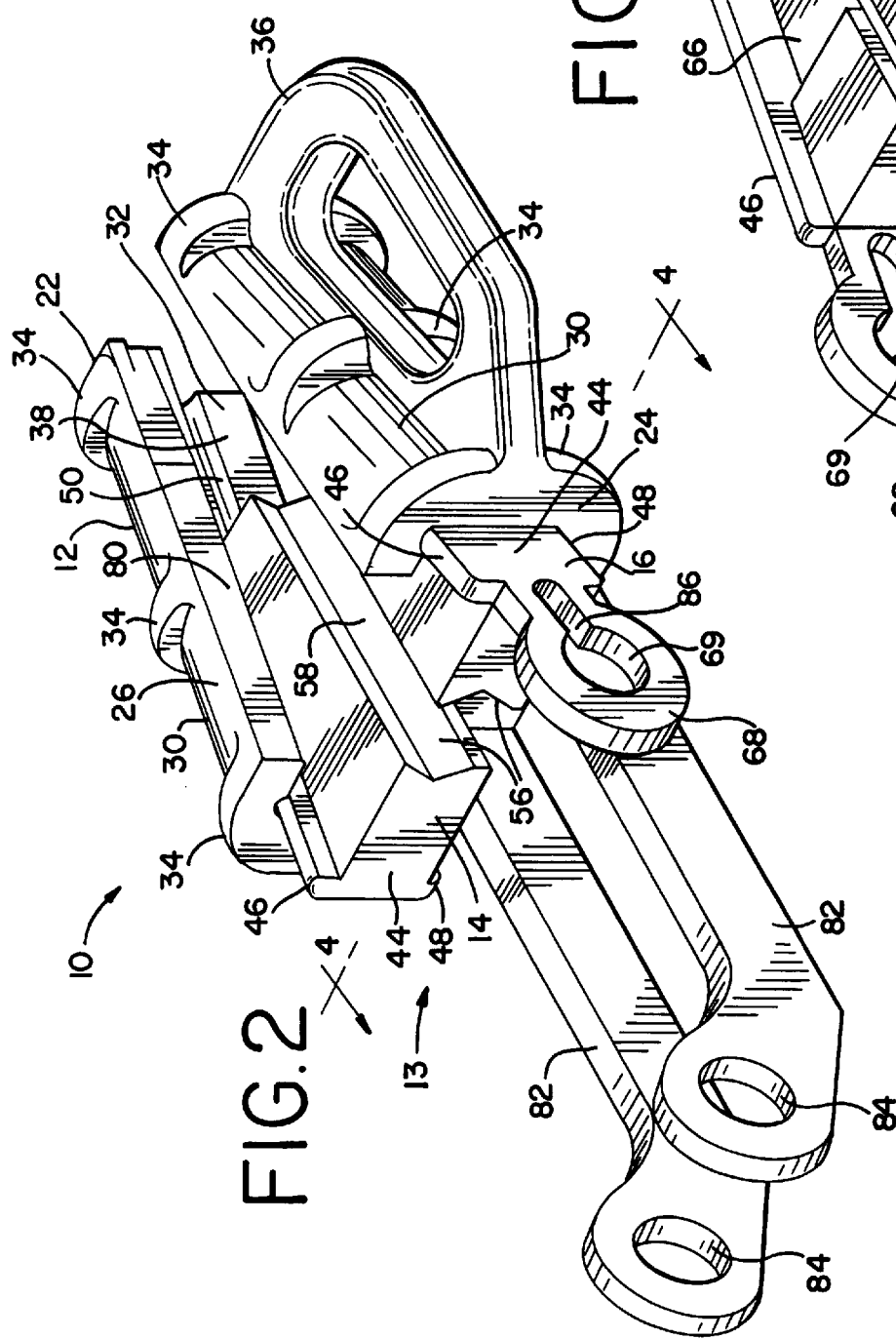

TOP OPENING CABLE CONNECTOR

FIELD OF THE INVENTION

The present invention relates to an improved cable connector of the type referred to as a wedge dead end or cable grip connector.

DESCRIPTION OF THE PRIOR ART

There is a need in transmission line or pole line systems to capture the end of a transmission line or cable and anchor it to a support. Connectors known as cable grips or dead end connectors have been used for this purpose. Typically such connectors include a body and a pair of gripping jaws that capture a cable with a wedge action.

U.S. Pat. No. 5,015,123 discloses an automatic cable gripping device including a pair of spring loaded gripper elements movable on inclined planar surfaces within a housing. A single coil spring is captured at an end of the gripper elements, and as a result the spring must be relatively short or the housing must be undesirably large. The cable is inserted axially between the gripper elements, and it is necessary for the installer to overcome the spring loading force while inserting the cable.

U.S. Pat. No. 5,539,961 discloses a spring-loaded wedge dead end having a body portion and a pair of jaws that are biased by a spring that engages a floater connected to the jaws. This assembly requires a spring that is relatively small in relation to the length of the body portion. The jaws are indirectly spring-biased, leading to the possibility of binding of the jaws in the body portion. The connection between the floater and the jaws relies on fragile tabs and guides. The floater can be latched in an open position so that the installer need not overcome the spring force when inserting a cable. however the cable must be installed from the side of the body portion, and this can be awkward in typical applications. It is possible for the device to become disabled by escape of the spring from its assembled position.

Other wedge action gripping devices are disclosed in U.S. Pat. Nos. 3,758,922; 4,407,471 and 4,872,626. Despite many attempts in the past, there remains a long-standing need for a cable connector that is sturdy and reliable in operation and that is easy to use.

SUMMARY OF THE INVENTION

A principal object of the present invention is to provide an improved cable connector of the type referred to as a dead end or cable grip connector. Other objects are to provide a cable connector in which the movement of the cable gripping jaws is reliably controlled and any tendency for the jaws to bind is minimized; to provide a connector in which the cable enters the body between the jaws from the top rather than from the side or axially; to provide a connector in which a sturdy and reliable structure is provided for synchronizing movement of the jaws and latching them in a cocked or open position; to provide an assembly in which the possibility of malfunction due to escape of jaw biasing springs is eliminated; and to provide a cable connector that overcomes disadvantages of connectors used in the past.

In brief, in accordance with the invention there is provided a connector assembly for the end of a cable including a body having front and back ends, opposed top and bottom walls and opposed side walls extending between the top and bottom walls. The top and bottom and side walls define a cavity extending axially between the front and back ends of the body The side walls define opposed elongated jaw guides at opposite sides of the cavity. The jaw guides are disposed at an angle relative to one another and are spaced apart by a larger distance adjacent the back end of the body and a shorter distance adjacent the front end of the body. A pair of opposed jaws in the cavity each jaw have a guide structure at the outer side of the jaw slideably supported in one of the jaw guides. The jaws have interfacing cable grip surfaces at the inner sides of the jaws defining an axially extending cable nest. The top wall has an axially extending cable receiving opening permitting top entry of the cable into the cable nest. A latch plate in the cavity is connected to the jaws. A latch normally holds the latch plate and jaws near the back of the body in a cocked position in which the cable grip surfaces are separated by a distance larger than the cable diameter. Spring means biases the jaws toward the front of the body for moving the jaws forward and together to grip a cable in the cable nest in response to release of the latch. The spring means includes a pair of springs, each connected between the body and one of the opposed jaws.

In brief, in accordance with other features of the invention, the jaw guides are generally T-shaped recesses, and the guide structures are generally T-shaped structures slideably captured within the jaw guides. A pair of support arms extend rearwardly from the rear wall. Attachment structures are at the ends of the support arms, and the support arms are spaced apart by a distance at least as large as the cable diameter. The latch plate is a quadrilateral member with front, back and side edges. Recesses in the bottom surfaces of the jaws receive the latch plate. The recesses have an axial length at least equal to the distance between the front and back edges of the latch plate. Jaw biasing springs are captured in retention grooves, and the grooves include tabs retaining the springs in the grooves.

BRIEF DESCRIPTION OF THE DRAWING

The present invention together with the above and other objects and advantages may best be understood from the following detailed description of the preferred embodiment of the invention illustrated in the drawings, wherein:

FIG. 1 is an exploded isometric view of a cable connector constructed in accordance with the present invention;

FIG. 2 is an isometric view of the cable connector with the jaws in the cocked or open position;

FIG. 3 is an isometric bottom view of the jaws of the cable connector;

DETAILED DESCRIPTION OF THE PREFERRED EMBODIMENTS

Figure 4:
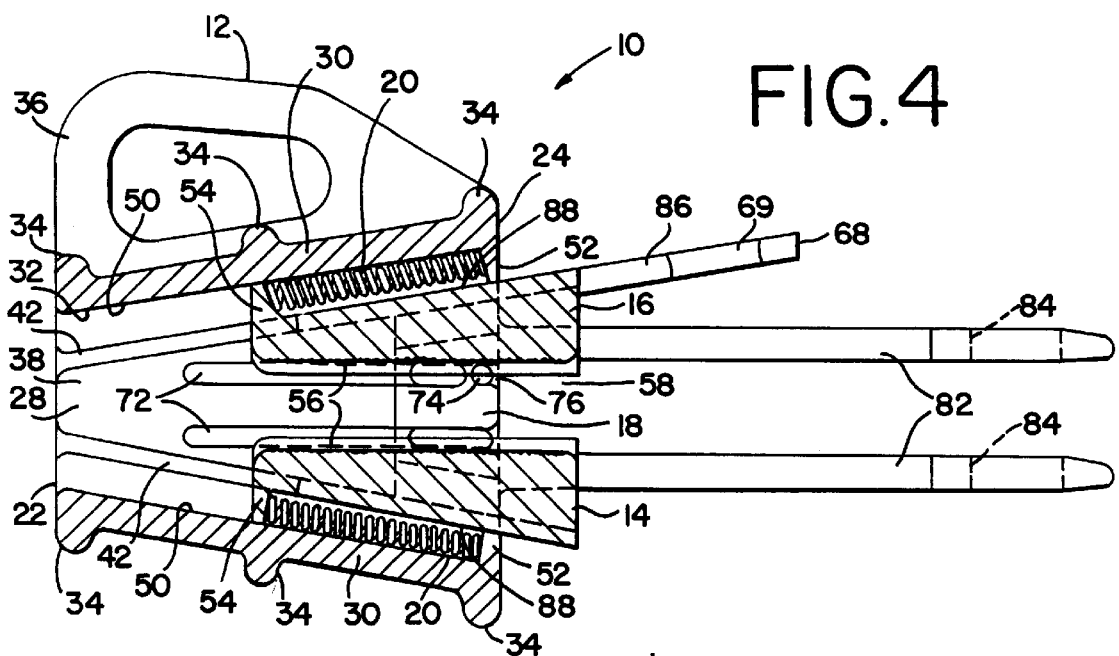
FIG. 4 is an axial cross sectional view of the cable connector taken along the line 4—4 of FIG. 2.
Figure 5:
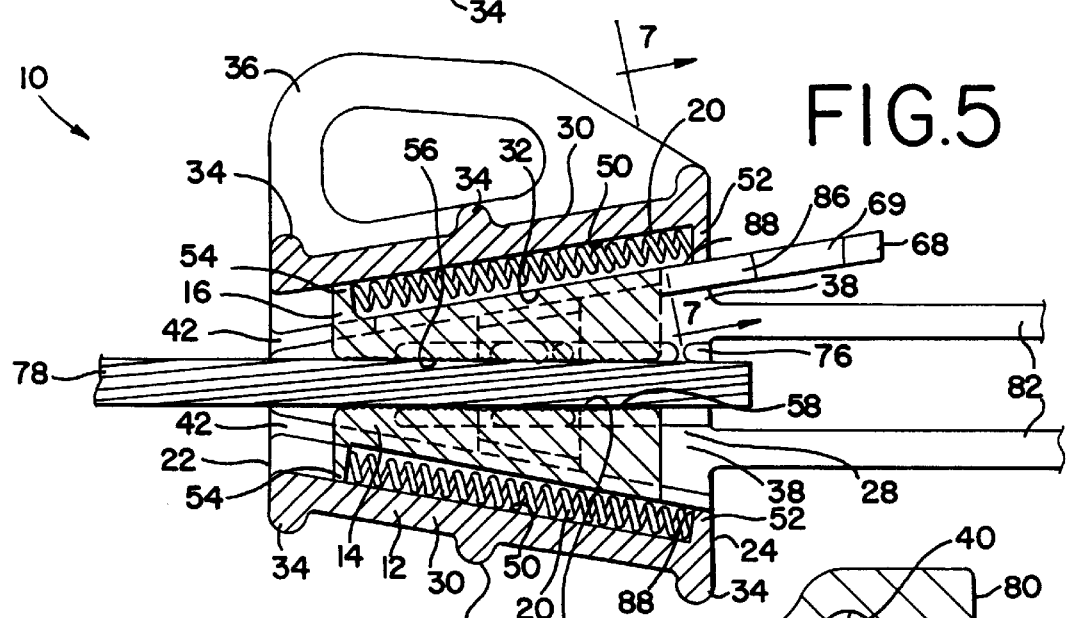
FIG. 5 is a cross section view like FIG. 4 showing the jaws gripping a cable.

Having reference now to the drawings, there is illustrated a cable connector generally designated as 10 constructed in accordance with the principles of the present invention. In general, the connector 10 includes a body 12 supporting a jaw assembly 13. The jaw assembly 13 includes a pair of jaws 14 and 16 and a latch plate 18 for synchronizing jaw movement and for releasably holding the jaws 14 and 16 in a cocked or open position seen in FIGS. 2 and 4. The jaw assembly 13 is spring biased toward a closed position. A pair of springs 20 directly bias the jaws 14 and 16 to grip an inserted cable when the latch plate is released (FIG. 5).

The body 12 is a unitary, one-piece metal part having a front end 22, a back end 24. A top wall 26, a bottom wall 28 extend between the front and back ends 22 and 24 of the body 12. Opposed side walls 30 extend between the top and bottom walls 26 and 28. A cavity 32 is defined within the body 12 by the walls 26, 28 and 30. The cavity 32 extends in an axial direction from the front end 22 to the back end 24. The body 12 is strengthened by ribs 34, and a handle 36 upon one of the side walls 30 permits the installer to hold the connector body 12.

In order to guide movement of the jaws 14 and 16 within the body 12, each of the side walls 30 is provided with an elongated generally T-shaped guide recess 38 extending from the back 24 toward the front 22 of the body 12. The recesses 38 are inclined relative to one another and relative to the axis of the body 12 to provide a wedge shape. The guide recesses 38 are closer together near the front end 22 of the body 12 and are farther apart near the back end 24. Each recess 38 includes upper and lower guideways 40 and 42. The jaws 14 and 16 include mating generally T-shaped outer guide structures 44 slideably received in the guide recesses 38. The structures 44 include upper and lower guide ribs 46 and 48 captured in the upper and lower guideways 40 and 42. Each jaw 14 and 16 is securely held for free sliding movement along the inclined paths provided by the recesses 38, and the jaws are positively prevented from moving in any other direction.

Springs 20 continuously bias the jaws 14 and 16 toward the front end 22 of the body 12. A spring receiving groove 50 is provided along the interior of each side wall 30. The grooves 50 extend along the interfaces of the guide recesses 38 and the guide structures 44. At the back end 24 of the body 12, the grooves 50 are closed by a wall 52 (FIGS. 1, 4 and 5). Each jaw 14 and 16 includes at its forward end a spring capture tab 54. The springs 20 are captured in compression in the grooves 50 between the walls 52 and the tabs 54. Because the springs 20 extend along the sides of the jaws 14 and 16, rather than abutting ends of the jaws within the cavity 32, it is possible for the springs 20 to have substantial length relative to the length of the body 12. This permits the springs 20 to have desired operating characteristics such as spring force and spring constant without the restrictions that would be imposed if only shorter springs could be used. In addition, the location of the springs to the sides of the jaws permits the body 12 to be shorter in length than might be required to obtain the advantages of longer springs.

The springs 20 are protected in the spring receiving grooves 50 beside the jaws 14 and 16. Each spring 20 independently and directly engages one of the jaws 14 and 16 and the motion of the jaws is accurately controlled by sliding of the ribs 46 and 48 of the jaws 14 and 16 within the guideways 40 and 42 of the body 12. This construction is very reliable because binding of the jaws 14 and 16 within the body 12 is prevented.

The latch plate 18 cooperates with the body 12 and the jaws 14 and 16 to retain the jaws 14 and 16 in a cocked or open position seen in FIG. 4. The jaws 14 and 16 include inner cable grip portions 56 that face one another at opposite sides of the longitudinal axis of the body 12. The cable grip portions 56 define an axially extending cable nest 58. The grip portions 56 are contoured with a V shape (FIGS. 1–3) and preferably are serrated to enhance the gripping action.

Figure 6:
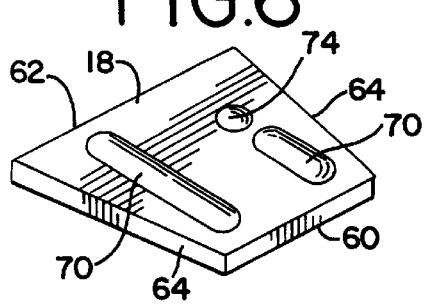
FIG. 6 is an isometric, enlarged, bottom view of the latch plate of the connector.

The latch plate 18 is a strong, simple quadrilateral, frustoconical plate with parallel forward and back edges 60 and 62 (FIGS. 1 and 6) and continuous, angled side edges 64. The undersides of the jaws 14 and 16 include recesses 66 that receive the full length of the latch plate 18. The jaw 16 is a pulling jaw used to move the jaws to their open position, and the jaw 14 is a non-pulling jaw. The jaw 16 includes a rearwardly extending pulling tab 68 projecting from the cavity 32. The installer grasps an opening 69 in the tab 68 and pulls the jaw 16 to the rear in order to compress the springs 20 and to open or cock the connector 10. The rearward movement of the pulling jaw 16 is coupled through the plate 18 to the non-pulling jaw 14 and both jaws move rearward simultaneously. The recesses 66 are at least as long as the distance between the front and back edges 60 and 62 of the plate 18, and the force transfer between the jaws is accomplished without the possibility of damage or breakage that could occur with more fragile mechanisms using small tabs and notches and the like.

Downwardly projecting guide ribs 70 in the latch plate 18 ride in mating guide grooves 72 formed in the bottom wall 28 of the body 12 and prevent jamming of the latch plate 18 within the body 12. One rib 70 is interrupted along its length to define a latch protuberance 74. The corresponding guide groove 72 is interrupted along its length to define a mating latch recess 76. When the jaw assembly 13 including the jaws 14 and 16 and the latch plate 18 is moved rearwardly, the protuberance 74 is captured in the recess 76 to secure the latch plate 18, and thus the jaws 14 and 16, in the rearward, open or cocked position. As seen in FIG. 4, in this open position, the cable grip portions 56 of the jaws 14 and 16 are spaced apart a distance larger than the diameter of a cable 78 (FIG. 5) to be inserted into the cable nest 58.

The top wall 26 of the body 12 includes a continuous, axially extending cable entry slot 80 aligned with and leading to the cable nest 58. As a result, the cable 78 can be placed into the cable nest 58 from above the connector 10 and through the top wall 26. In typical applications, it is easier for the installer to insert the cable from above, rather than axially or from the side of a cable connector.

To anchor the connector 10 to a support, the body 12 includes two rearwardly extending clevis legs 82 or support arms. The legs 82 extend in the axial direction from the bottom wall 28 at the back end 24 of the body 12, and the ends of the legs 82 are provided with aligned mounting holes 84 permitting the arms to be attached to a support using a pin or rod extending through the holes 84. The ends of the legs 82 are angled upwardly, and the common centerline of the mounting holes 84 is parallel to the bottom wall 28 and is perpendicular to and intersects the axis of the cable nest 58. The legs 82 are symmetrical with respect to the axis of the body 12 and with respect to the cable nest 58, and forces are transferred in a balanced fashion through the body 12. The force applied by tension of a cable held in the cable nest 58 is aligned with and not offset relative to the clevis legs 82. The legs 82 are spaced apart a distance larger than the diameter of the cable 78 and do not interfere with loading of the cable 78 from the top of the connector 10.

A spring access slot 86 is formed in the pulling tab 68, extending forward from the opening 69. In order to insert the springs 20 into the spring receiving grooves 50, the jaws 14 and 16 are moved to their forwardmost positions. This exposes the rearward segments of the spring receiving grooves 50. The springs 20 can then be inserted into the grooves 50 from the rear. The slot 86 provides access to the groove 50 adjacent the pulling jaw 16.

Figure 7:
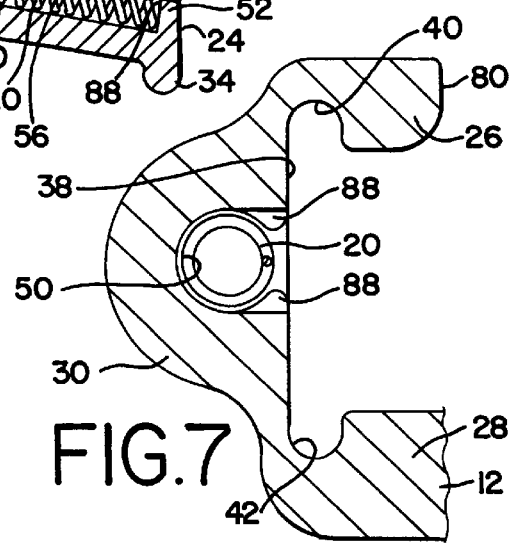
FIG. 7 is an enlarged, fragmentary sectional view taken along the line 7—7 of FIG. 5.

After the springs 20 are loaded into the spring retention grooves 50, the springs 20 move the jaws 14 and 16 forward, until such time as the jaws 14 and 16 are latched in the open position of FIG. 4. When the jaws 14 and 16 are in their forward positions, the rearward segments of the springs 20 are exposed at the rearward segments of the open-sided spring receiving grooves 50. Retention tabs 88 (FIGS. 5 and 7) are defined by the body 12. These tabs overly the rearward ends of the springs 20 by partly closing the open sides of the grooves 50, and capture the springs 20 so that they cannot escape from the grooves 50 and disable the connector 10.

In operation, the installer prepares the connector 10 by pulling the tab 68 to the rear, for example by grasping and separating the handle 36 and the tab 68. The latch protuberance 74 seats in the latch recess 76 to hold the latch plate 18 and the jaws 14 and 16 in the open, cocked position of FIG. 4 with the springs 20 compressed. The cable 78 is loaded from the top through the cable entry slot 80 into the cable nest 58. The latch plate 18 and the jaws 14 and 16 are released, for example by striking the rear end of the tab 68 with a blow sufficient to unseat the latch protuberance 74 from the latch recess 76. The springs 20 independently and directly drive the jaws 14 and 16 forward. The forward motion of the jaws 14 and 16 is synchronized by the latch plate 18 received in the recesses 66 in the jaws 14 and 16. The jaws 14 and 16 are guided by the capture of the T-shaped jaw guide structures 44 within the T-shaped body guide recesses 38, and the latch plate 18 is guided by movement of the plate guide ribs 70 in the body guide grooves 72. The force provided by the springs 20 moves the jaws 14 and 16 forward and together with a wedge action against the cable 78 as seen in FIG. 5. The clevis legs 82 are attached to a support, and tension in the cable 78 has the effect of pulling the jaw grip portions 58 more tightly against the cable 78.

While the present invention has been described with reference to the details of the embodiment of the invention shown in the drawing, these details are not intended to limit the scope of the invention as claimed in the appended claims.

What is claimed is:

1. A connector assembly for an end of a cable, said connector assembly comprising:
    a body having front and back ends, opposed top and bottom walls and opposed side walls extending between said top and bottom walls, said top and bottom and side walls defining a cavity extending axially between said front and back ends of said body;
    said side walls defining opposed elongated jaw guides at opposite sides of said cavity, said jaw guides being disposed at an angle relative to one another and being spaced apart by a larger distance adjacent said back end of said body and a shorter distance adjacent said front end of said body;
    a pair of opposed jaws in said cavity, each jaw having a guide structure at an outer side of said jaw slideably supported in one of said jaw guides, said jaws having interfacing cable grip surfaces at inner sides of said jaws defining an axially extending cable nest;
    said top wall having an axially extending cable receiving opening permitting top entry of the cable into said cable nest;
    a latch plate in said cavity connected to said jaws;
    a latch means for normally holding said latch plate and jaws adjacent the back end of said body in an open cocked position in which said cable grip surfaces are separated by a distance larger than a cable diameter; and
    spring means biasing said jaws toward the front end of said body for moving said jaws forward and together to grip a cable in said cable nest in response to release of said latch;
    said connector assembly being characterized by:
    said spring means including a pair of springs, each connected between said body and one of said opposed jaws.

2. The connector assembly of claim 1 further comprising a pair of spring receiving grooves, one defined in each said side wall, said springs comprising coil springs in compression between one said jaw and said body and having an uncompressed length at least equal to more than half the distance between said front and back ends of said body, one of said springs being mounted in each said spring receiving groove.

3. The connector assembly of claim 2, said jaw guides being generally T-shaped recesses, and said guide structures being generally T-shaped structures slideably captured within said jaw guides, said spring receiving grooves being defined in said T-shaped recesses.

4. The connector assembly of claim 1, said jaw guides being generally T-shaped recesses, and said guide structures being generally T-shaped structures slideably captured within said jaw guides.

5. The connector assembly of claim 1, further comprising a pair of support arms extending rearwardly from said back end, attachment structures at the ends of said support arms, and said support arms being spaced apart by a distance at least as large as the cable diameter.

6. The connector assembly of claim 5, said attachment structures comprising mounting holes in distal ends of said arms, said holes having a common centerline parallel to said front and back walls of said body and perpendicular to and intersecting the axis of said cable nest.

7. The connector assembly of claim 1, said jaws having bottom surfaces overlying said bottom wall of said body;
    said latch plate being a quadrilateral member with front, back and side edges;
    recesses in said bottom surfaces receiving said latch plate, said recesses having an axial length at least equal to a distance between said front and back edges of said latch plate.

8. The connector assembly of claim 7 further comprising an axially extending guide system including a guide groove and mating ridge defined in said latch plate and in said bottom surfaces.

9. The connector assembly of claim 8, said latch means being defined by mating interruptions in said guide groove and ridge.

10. The connector assembly of claim 8, said guide system including a pair of said guide grooves and mating ridges.

11. A connector assembly for an end of a cable, said connector assembly comprising:
    a body having front and back ends, opposed top and bottom walls and opposed side walls extending between said top and bottom walls, said top and bottom and side walls defining a cavity extending axially between said front and back ends of said body;
    said side walls defining opposed elongated jaw guides at opposite sides of said cavity, said jaw guides being disposed at an angle relative to one another and being spaced apart by a larger distance adjacent said back end of said body and a shorter distance adjacent said front end of said body;
    a pair of opposed jaws in said cavity, each jaw having a guide structure at an outer side of said jaw slideably supported in one of said jaw guides, said jaws having interfacing cable grip surfaces at inner sides of said jaws defining an axially extending cable nest;

said top wall having an axially extending cable receiving opening permitting top entry of the cable into said cable nest;

a latch plate in said cavity connected to said jaws;

a latch means for normally holding said latch plate and jaws adjacent the back end of said body in an open cocked position in which said cable grip surfaces are separated by a distance larger than a cable diameter; and spring means biasing said jaws toward the front end of said body for moving said jaws forward and together to grip a cable in said cable nest in response to release of said latch means;

said connector assembly being characterized by:

said jaw guides being generally T-shaped recesses, and said guide structures being generally T-shaped structures slideably captured within said jaw guides.

12. A connector assembly for an end of a cable, said connector assembly comprising:

a body having front and back ends, opposed top and bottom walls and opposed side walls extending between said top and bottom walls, said top and bottom and side walls defining a cavity extending axially between said front and back ends of said body;

said side walls defining opposed elongated jaw guides at opposite sides of said cavity, said jaw guides being disposed at an angle relative to one another and being spaced apart by a larger distance adjacent said back end of said body and a shorter distance adjacent said front end of said body;

a pair of opposed jaws in said cavity, each jaw having a guide structure at an outer side of said jaw slideably supported in one of said jaw guides, said jaws having interfacing cable grip surfaces at inner sides of said jaws defining an axially extending cable nest;

said top wall having an axially extending cable receiving opening permitting top entry of the cable into said cable nest;

a latch plate in said cavity connected to said jaws;

a latch means for normally holding said latch plate and jaws adjacent the back end of said body in an open cocked position in which said cable grip surfaces are separated by a distance larger than a cable diameter; and spring means biasing said jaws toward the front end of said body for moving said jaws forward and together to grip a cable in said cable nest in response to release of said latch means;

said connector assembly being characterized by:

a pair of support arms extending rearwardly from said back end, attachment structures at the ends of said support arms, and said support arms being spaced apart by a distance at least as large as the cable diameter.

13. The connector assembly of claim 12, said attachment structures comprising mounting holes in distal ends of said arms, said holes having a common centerline parallel to said front and back walls of said body and perpendicular to and intersecting the axis of said cable nest.

14. A connector assembly for an end of a cable, said connector assembly comprising:

a body having front and back ends, opposed top and bottom walls and opposed side walls extending between said top and bottom walls, said top and bottom and side walls defining a cavity extending axially between said front and back ends of said body;

said side walls defining opposed elongated jaw guides at opposite sides of said cavity, said jaw guides being disposed at an angle relative to one another and being spaced apart by a larger distance adjacent said back end of said body and a shorter distance adjacent said front end of said body;

a pair of opposed jaws in said cavity, each jaw having a guide structure at an outer side of said jaw slideably supported in one of said jaw guides, said jaws having interfacing cable grip surfaces at inner sides of said jaws defining an axially extending cable nest;

said top wall having an axially extending cable receiving opening permitting top entry of the cable into said cable nest;

a latch plate in said cavity connected to said jaws;

a latch means for normally holding said latch plate and jaws adjacent the back end of said body in an open cocked position in which said cable grip surfaces are separated by a distance larger than a cable diameter; and spring means biasing said jaws toward the front end of said body for moving said jaws forward and together to grip a cable in said cable nest in response to release of said latch;

said connector assembly being characterized by:

said jaws having bottom surfaces overlying said bottom wall of said body;

said latch plate being a quadrilateral member with front, back and side edges;

recesses in said bottom surfaces receiving said latch plate, said recesses having an axial length at least equal to a distance between said front and back edges of said latch plate.

15. The connector assembly of claim 14 further comprising an axially extending guide system including a guide groove and a mating ridge defined in said latch plate and in said bottom surfaces.

16. The connector assembly of claim 15, said latch means being defined by mating interruptions in said guide groove and ridge.

17. A connector assembly for an end of a cable, said connector assembly comprising:

a body having front and back ends, opposed top and bottom walls and opposed side walls extending between said top and bottom walls, said top and bottom and side walls defining a cavity extending axially between said front and back ends of said body;

said side walls defining opposed elongated jaw guides at opposite sides of said cavity, said jaw guides being disposed at an angle relative to one another and being spaced apart by a larger distance adjacent said back end of said body and a shorter distance adjacent said front end of said body;

a jaw assembly including a pair of opposed jaws in said cavity, each jaw having a guide structure at an outer side of said jaw slideably supported in one of said jaw guides, said jaws having interfacing cable grip surfaces at inner sides of said jaws defining an axially extending cable nest;

said jaw assembly including a latch plate in said cavity connected to said jaws;

said top wall having an axially extending cable receiving opening permitting top entry of the cable into said cable nest;

a latch means for normally holding said jaw assembly adjacent the back end of said body in an open cocked position in which said cable grip surfaces are separated by a distance larger than a cable diameter; and spring means biasing said jaw assembly toward the front end of said body for moving said jaws forward and together to grip a cable in said cable nest in response to release of said latch means;

said connector assembly being characterized by:

a spring receiving groove having an open side formed in said body and extending in an axial direction adjacent said jaw assembly, said spring receiving groove having a rearward portion extending beyond said jaw assembly when said jaw assembly is biased toward the front end of said body;

said spring means including a cylindrical coil spring mounted within said spring receiving groove and held in compression between said body and said jaw assembly; and a retention member located in the open side of said spring receiving groove and overlying said spring at said rearward portion of said spring receiving groove.

18. The connector assembly of claim 17, said retention member comprising at least one tab defined by said body and at least partly closing the open side of said spring receiving groove.

* * * * *